United States Patent Office 3,507,450
Patented Apr. 21, 1970

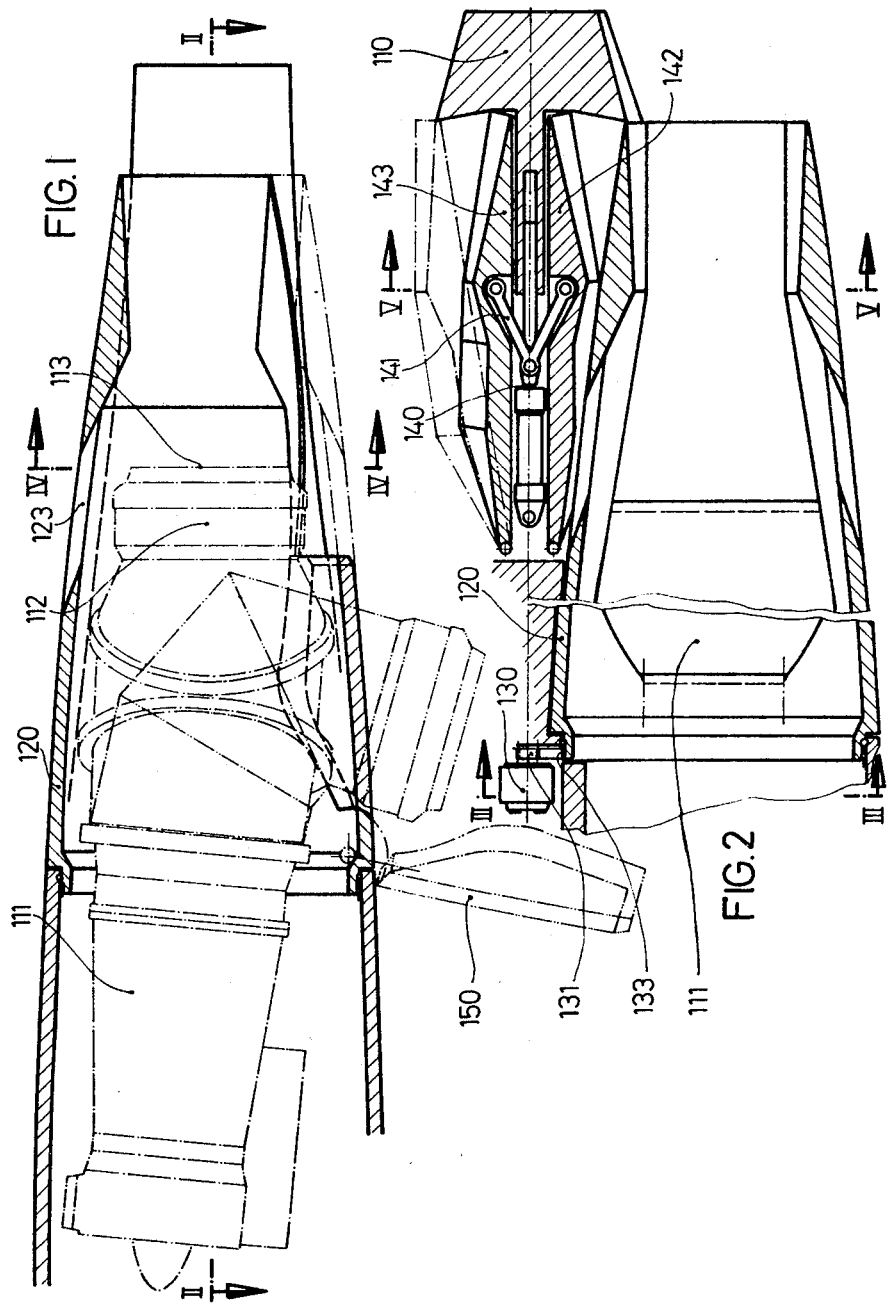

3,507,450
JET ENGINE EJECTOR NOZZLE
Erich W. Weigmann and Wolf Rösiger, Munich,
Germany, assignors to Entwicklungsring Sud
G.m.b.H., Munich, Germany
Filed Apr. 26, 1968, Ser. No. 724,397
Claims priority, application Germany, Apr. 28, 1967,
E 33,903
Int. Cl. B64c *15/08*
U.S. Cl. 239—265.35    6 Claims

ABSTRACT OF THE DISCLOSURE

An ejector nozzle particularly adapted for use with the propulsion means of a vertical takeoff and landing jet aircraft. The illustrated embodiment includes a primary nozzle, the exhaust orifice of which may be selectively turned so as to provide vertical thrust. Coaxially positioned about the primary nozzle is a secondary nozzle in the form of a cylindrical segment. The cylindrical segment defines a longitudinal opening, the width of which is sufficient to allow the primary nozzle to pass therethrough. Means are additionally included for enclosure of the secondary nozzle opening during normal cruise flight so as to provide a satisfactory airfoil.

BACKGROUND OF THE INVENTION

This invention generally relates to an ejector nozzle for jet aircraft engines and more particularly relates to a rotatable ejector nozzle adapted for use with the jet engines of vertical takeoff and landing (VTOL) and short takeoff and landing (STOL) aircraft.

Certain ejector nozzles presently used for VTOL and STOL aircraft achieve the desired ejector effect of the exhaust jet of the engine by means of doors which extend outwardly and thereby clear the ejector opening or by the axial shifting of a secondary nozzle. The axial shifting of the secondary nozzle aids the fresh air intake into the exhaust jet at the primary nozzle exhaust end. With respect to such arrangements, the aerodynamic conditions of the aircraft are frequently adversely affected. Further, such constructional arrangements often require complex actuating, guiding and retaining apparatus. Furthermore, some conventional means for extending aircraft nozzle segments frequently adversely affect the aerodynamic conditions to such an extent that optimum horizontal stabilization is difficult to obtain.

A main feature of the illustrated embodiment is the avoidance of tilting segments such as are found in conventional nozzles. With respect to the illustrated embodiment, the bottom opening required to facilitate primary nozzle vertical thrust deflection is provided by turning the nozzle or a part thereof, as will subsequently be further described. The illustrated embodiment, in contrast to those designs using tilting nozzle segments, provides an aircraft with improved aerodynamic performance.

With further reference to the illustrated embodiment, the desirable features are obtained by using a one-piece rotatable secondary nozzle coaxially installed about the jet engine primary nozzle. The primary nozzle includes means for tilting the same downwardly to obtain vertical thrust. The secondary nozzle is provided with an elongated opening extending substantially along its entire length. The width of the opening is slightly larger than the outside diameter of the tilting primary nozzle to permit passage therethrough during vertical flight. Additionally, the illustrated embodiment includes means for securing the opening in the form of sliding element mounted in the airframe. The sliding element of the illustrated embodiment is shifted by an actuator that is synchronized with a secondary nozzle rotating motor. The illustrated construction results in an airframe contour with a more favorable aerodynamic design than that generally obtainable with conventional arrangements.

The illustrated embodiment includes twin jet engines utilizing a single actuating mechanism for selectively positioning the secondary nozzles into and out of obstructing relation with the primary nozzles. By the use of a single actuating means, an efficient construction, as well as a weight reduction are realized; furthermore, the loads are balanced and the moments are shifted more continuously and uniformly.

The illustrated embodiment includes closing elements which define surfaces for centering and retaining the secondary nozzle in its operating position. To facilitate the opening and corresponding locking operation of the secondary nozzle, the sliding closing element is combined with an extendable brake flap. The axis of the brake flap in its open position is normal to the longitudinal axis of the closing element. This particular structural arrangement is relatively economical and results in a weight decrease over prior constructions, since additional brake flaps are normally no longer necessary.

A main object of the invention is to provide an improved ejector nozzle for a jet engine. A more particular object is to provide such an ejector nozzle which exhibits improved aerodynamic and structural qualities. Other objects and advantages of the invention will become apparent with reference to the following description and accompanying drawings which show an illustrative embodiment of this invention.

BRIEF DESCRIPTION OF THE DRAWINGS

FIGURE 1 is a sectional view of a portion of the propulsion means of a jet aircraft including certain features of this invention.

FIGURE 2 is a partial sectional view of the propulsion means of FIGURE 1 taken along the line II—II of FIGURE 1.

DESCRIPTION OF THE PREFERRED EMBODIMENT

Figure 3:
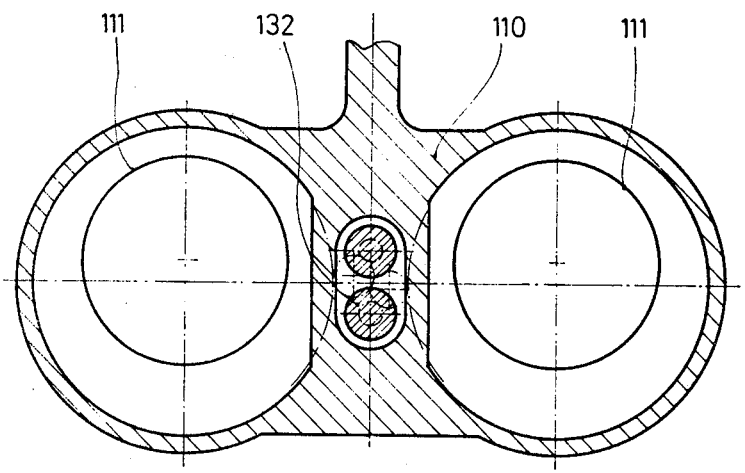
FIGURE 3 is a full sectional view taken along the line III—III of FIGURE 2.
Figure 4:
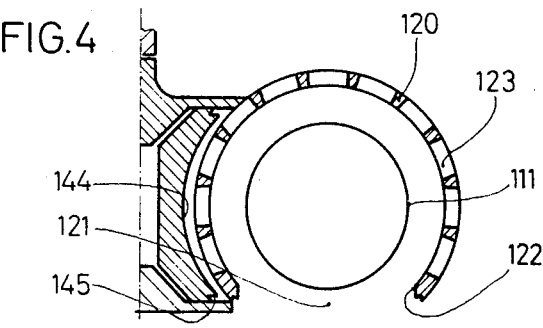
FIGURE 4 is a sectional view taken along the line IV—IV of FIGURE 1.
Figure 5:
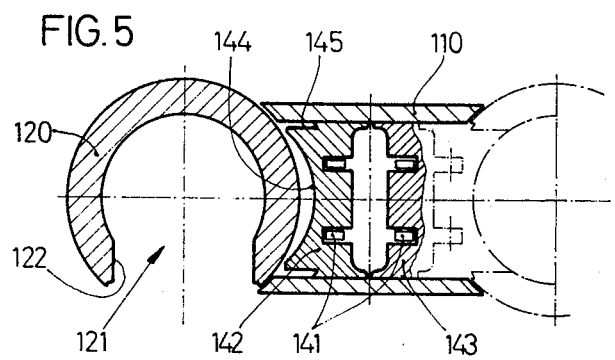
FIGURE 5 is a sectional view taken along the line V—V of FIGURE 2.

With particular reference to FIGURES 1 and 2, the propulsion means of a VTOL aircraft is illustrated which is provided with a pair of jet engines 111, each of which includes a tilting primary nozzle 112 mounted within an airframe 110. A secondary nozzle 120 is provided which is rotatable through a right angle about its longitudinal axis. The secondary nozzl 120 is coaxially positioned about the primary nozzle 112. With particular reference to FIGURES 4 and 5, this secondary nozzle 120 defines an opening 121 which extends substantially along its entire length. A motor 130, rigidly mounted to the airframe 110 drives a transmission 132 via a pinion 131. Correspondingly, the transmission 132 in turn engages gear teeth 133 formed about the circumference of the secondary nozzle 120 so as to selectively cause rotation thereof. During vertical operation of the aircraft, the opening 121 is positioned downwardly, as in FIGURES 4 and 5, so as to permit the primary nozzle 112 to tilt therethrough, as illustrated in phantom in FIGURE 1.

Prior to rotation of the secondary nozzle 120, an actuator 140, the operation of which is synchronized with the turning motor 130, is energized. This actuator 140, as shown in FIGURES 2 and 5, closes elements 142 and 143 by means of a lever 141. While the illustrated actuator is shown in conjunction with a dual-engine aircraft, it should be understood that a similar arrangement may be used with aircraft propulsion means utilizing a single engine. The closing elements define a curved surface 144 having a diameter approximately equal to the inside diameter of the secondary nozzle surface. The closing elements define centering surfaces 145 which engage with the surfaces 122 so as to retain and seal the jet channel, as illustrated in phantom in FIGURE 5. Ejector openings 123 are provided along the periphery of the secondary nozzle 120 adjacent the area of an exhaust opening 113 of the primary nozzle 112. The opening 121 of the secondary nozzle 120 may be opened along its entire length by means of the closing elements 142 or 143, respectively, or may be closed by the vertically extending brake flap 150. The combination of a brake flap 150 and closing elements 142 and 143 produces an efficient engine design particularly suitable for VTOL and STOL aircraft.

Although but one specific embodiment of this invention has been herein shown and described, it should be understood that certain details of the construction shown may be altered without departing from the spirit and scope of this invention.

We claim:

1. An ejector nozzle for use with a jet-propelled aircraft comprising a jet engine including a cylindrically-shaped primary nozzle, a cylindrically-shaped secondary nozzle coaxially positioned about and axially rotatable with respect to said primary nozzle, said secondary nozzle defining an elongated longitudinally oriented opening, the width of said opening being greater than the outer diameter of said primary nozzle, and means for rotatably moving said secondary nozzle with respect to said primary nozzle about the axis thereof.

2. An apparatus in accordance with claim 1 which further includes means for selectively obstructing the opening defined by said secondary nozzle.

3. An apparatus in accordance with claim 2 wherein said selective obstructing means and said rotating means are simultaneously actuated.

4. An apparatus in accordance with claim 3 wherein said obstructing means defines developed surfaces for cooperation with the margins of said secondary nozzle defining said elongated opening.

5. An apparatus in accordance with claim 4 which further includes a selectively positionable brake flap selectively movable into and out of obstructing relation with said elongated opening.

6. An apparatus in accordance with claim 5 wherein the jet-propelled aircraft comprises a pair of jet engines and wherein said rotatable moving means is utilized to actuate the ejector nozzle apparatus of each of said engines.

References Cited

UNITED STATES PATENTS

| 3,067,579 | 12/1962 | Olbrich | 60—232 |
| 3,084,508 | 4/1963 | Olbrich | 60—232 |
| 3,416,754 | 12/1968 | Pinaire et al. | 60—232 X |
| 3,450,348 | 6/1969 | Kopp | 60—232 X |

M. HENSON WOOD, JR., Primary Examiner

J. J. LOVE, Assistant Examiner

U.S. Cl. X.R.

60—232; 239—265.19, 265.33